(12) United States Patent
Mackin

(10) Patent No.: US 8,707,716 B1
(45) Date of Patent: Apr. 29, 2014

(54) RE-CIRCULATING DEFROSTING HEAT EXCHANGER

(75) Inventor: Steve G. Mackin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 245 days.

(21) Appl. No.: 13/325,871

(22) Filed: Dec. 14, 2011

(51) Int. Cl.
*F25D 21/00* (2006.01)

(52) U.S. Cl.
USPC .................................. 62/80; 62/151; 62/234

(58) Field of Classification Search
CPC ..... F25D 21/006; F25D 21/002; F25D 21/05; F25D 21/008; F25D 21/08; F25B 47/022; F25B 41/04
USPC ................ 62/80, 81, 151, 152, 156, 234, 419
See application file for complete search history.

(56) References Cited

U.S. PATENT DOCUMENTS

| | | | | |
|---|---|---|---|---|
| 3,633,378 A | * | 1/1972 | Toth | 62/196.4 |
| 3,807,189 A | * | 4/1974 | Eber et al. | 62/110 |
| 4,389,851 A | * | 6/1983 | Chrostowski et al. | 62/81 |
| 5,575,158 A | * | 11/1996 | Vogel | 62/196.4 |
| 5,694,782 A | * | 12/1997 | Alsenz | 62/156 |
| 5,921,092 A | * | 7/1999 | Behr et al. | 62/81 |
| 6,094,925 A | * | 8/2000 | Arshansky et al. | 62/81 |
| 6,170,270 B1 | * | 1/2001 | Arshansky et al. | 62/81 |
| 6,889,759 B2 | * | 5/2005 | Derosier | 165/151 |
| 7,171,817 B2 | * | 2/2007 | Birgen | 62/81 |
| 7,523,622 B2 | | 4/2009 | Zywiak et al. | |
| 7,614,249 B2 | * | 11/2009 | Hu | 62/324.1 |
| 2008/0314060 A1 | | 12/2008 | Parikh | |
| 2009/0125167 A1 | | 5/2009 | Ma et al. | |
| 2009/0260387 A1 | | 10/2009 | DeFrancesco | |
| 2011/0107777 A1 | | 5/2011 | Atkey et al. | |
| 2013/0031917 A1 | | 2/2013 | Mackin | |

* cited by examiner

*Primary Examiner* — Mohammad M Ali

(57) ABSTRACT

A method of defrosting a heat exchanger while the heat exchanger continues to cool air passing through the heat exchanger. The heat exchanger includes liquid passages for carrying cold liquid between an inlet and an outlet and air passages in thermal communication with the liquid passages for cooling air passing through the air passages. The method includes introducing warmer liquid to a first selected section of the heat exchanger liquid passage while continuing to provide cold liquid to the liquid passages of the heat exchanger.

13 Claims, 4 Drawing Sheets

RE-CIRCULATING DEFROSTING HEAT EXCHANGER

BACKGROUND

The present invention generally relates to liquid-to-air heat exchangers, and more particularly, to a method and apparatus of continually operating a heat exchanger prone to icing.

Liquid-to-air heat exchangers are used in various applications including for chilling passenger compartment air in aircraft. This type of heat exchanger works by exchanging thermal energy by thermal conduction. Air is directed across a surface having a large area cooled by a liquid. As the air flows across the surface the air near the surface begins to cool. If the temperature of the air drops to or below a dew point temperature of the air, water suspended within the gas begins to condense on the surface and form ice. This ice can block air flow through the passages, thereby reducing the overall efficiency of the heat exchanger. Conventionally, this problem is addressed by maintaining the liquid in the heat exchangers at a temperature above freezing for water or by periodically bypassing the chilled liquid to permit the air to warm the cooled exchanger surface and melt accumulated ice.

When the liquid temperature is maintained above freezing to prevent the condensate from freezing in the air passages, the cooling capacity of the heat exchanger is negatively impacted. Further, defrosting the entire heat exchanger at once interrupts cooling, which affects passenger comfort. In addition, the duration of the defrost cycle is a function of air temperature and humidity so additional sensors and sophisticated logic are required. Further, defrosting the entire heat exchanger dramatically increases the water flow into the air. The air flow and water flow need to be carefully managed so water is not entrained into the air and sprayed into the passenger compartment.

As will be appreciated by those skilled in the art, cooling capacity could be greatly increased if the exchanger could be defrosted without significantly impacting air delivery rates and liquid temperatures. Continual cooling would minimize performance impact

SUMMARY

In one aspect, the present disclosure includes a method of defrosting a heat exchanger while the heat exchanger continues to cool air passing through the heat exchanger. The heat exchanger includes a plurality of liquid passages for carrying cold liquid between an inlet and an outlet and air passages in thermal communication with the liquid passages for cooling air passing through the air passages. The method comprises the step of introducing warmer liquid to a first selected section of the heat exchanger liquid passage while continuing to provide cold liquid to the liquid passages of the heat exchanger.

In another aspect, the present disclosure includes a heat exchanger. The heat exchanger includes liquid passages extending from a common header connected to a liquid inlet for introducing cold liquid to the header. Air passages extend between and in thermal communication with the liquid passages for cooling air passing through the air passages. The heat exchanger also includes a first injector positioned in the liquid passage header for introducing warmer liquid at a higher pressure to a section of the liquid passages for defrosting a corresponding section of the air passages. A control selectively introduces warmer liquid through the first injector to the section of the liquid passages.

In still another aspect, the present disclosure includes a heat exchanger system comprising a heat exchanger having liquid passages extending between a common header connected to a liquid inlet for introducing cold liquid to the header and a common outlet header connected to a liquid outlet for discharging liquid. The heat exchanger also has air passages extending between and in thermal communication with the liquid passages for cooling air passing through the air passages. In addition, the system includes a manifold in fluid communication with the liquid outlet of the heat exchanger and a pump operatively connected to the manifold for pressurizing liquid in the manifold. The system has a first injector positioned in the liquid passage header and connected to the manifold for introducing warmer liquid to a section of the liquid passages for defrosting a corresponding section of the air passages. A control is operatively connected to the first injector for selectively opening the injector to introduce warmer liquid through the first injector to the section of the liquid passages for defrosting the corresponding section of the air passages.

Other aspects of the present disclosure will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
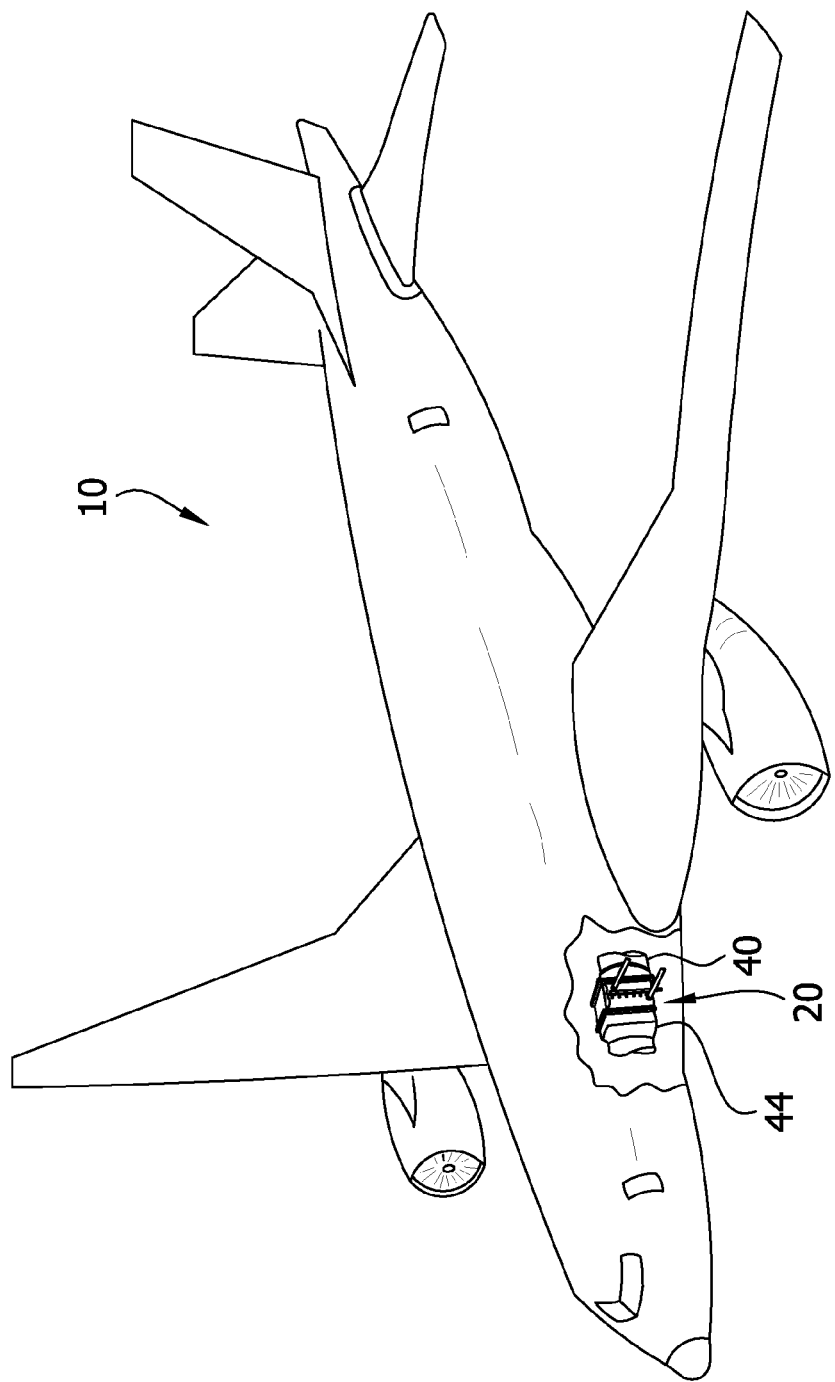
FIG. 1 is a perspective of a fragmentary aircraft having a liquid-to-air heat exchanger therein.

Referring to the figures, and in particular to FIG. 1, an aircraft is designated in its entirety by the reference number 10. The aircraft 10 is an example of aircraft in which a re-circulating defrosting heat exchanger may be used to cool passenger compartment air.

Figure 2:
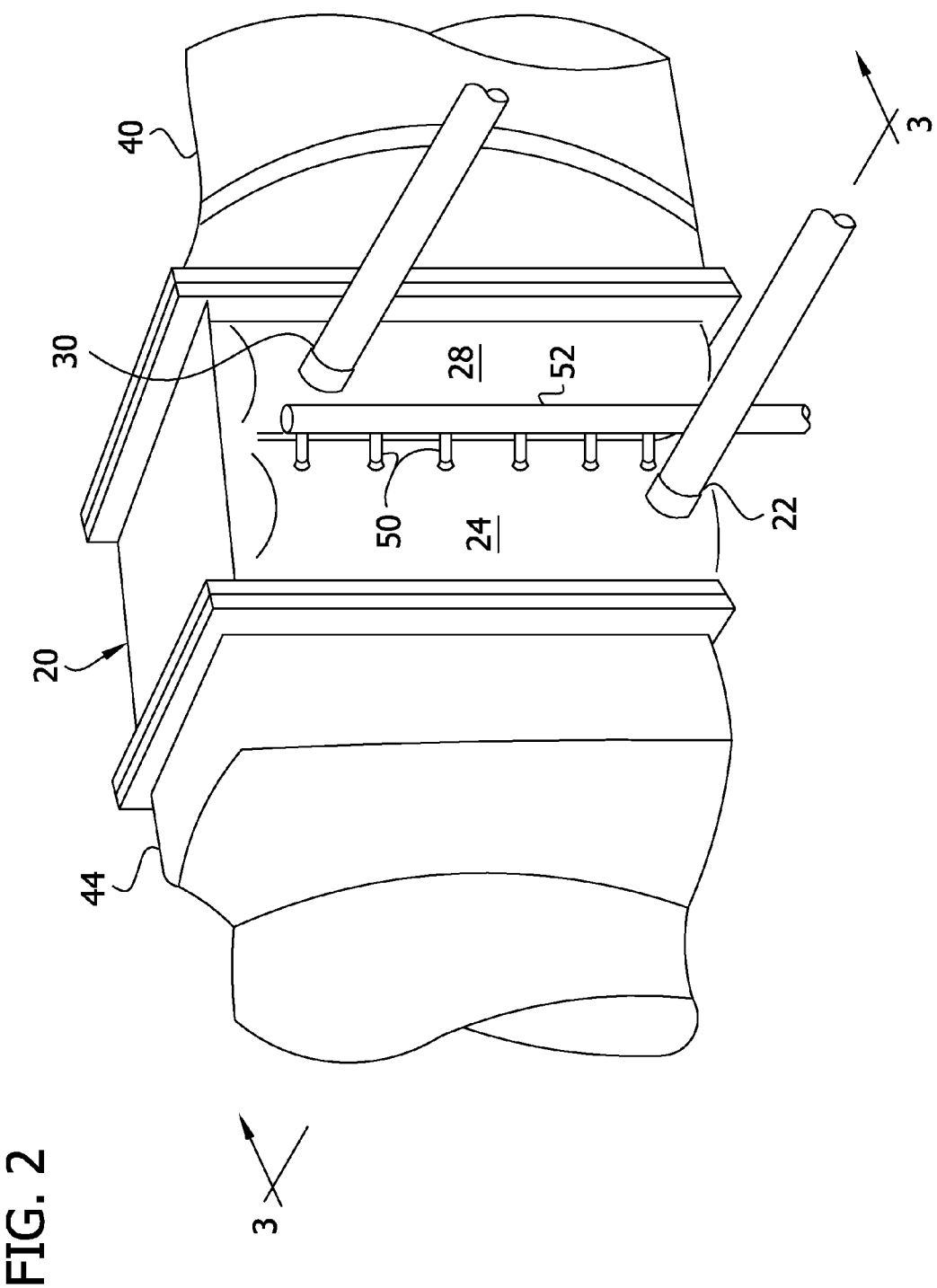
FIG. 2 is a perspective a liquid-to-air heat exchanger of one embodiment.
Figure 3:
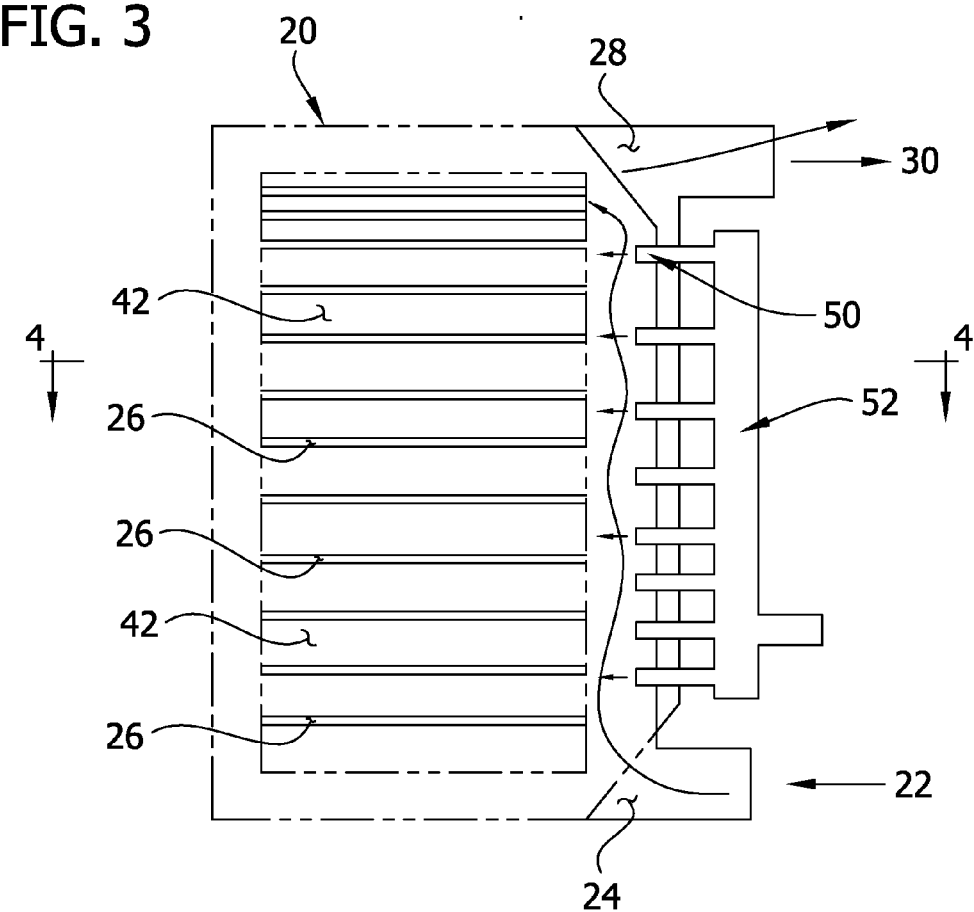
FIG. 3 is a schematic cross section of the heat exchanger taken in the plane of line 3-3 of FIG. 2.
Figure 4:
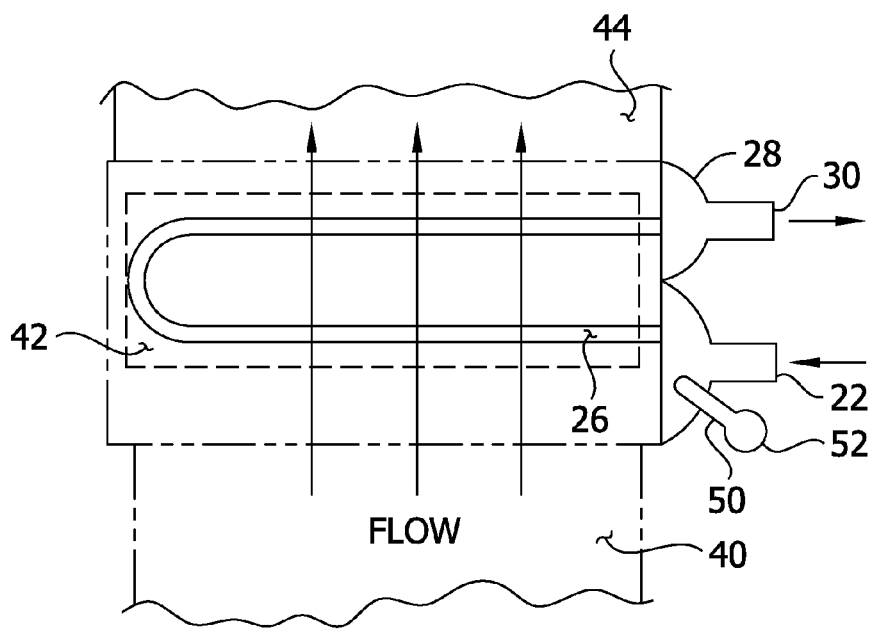
FIG. 4 is a schematic cross section of the heat exchanger taken in the plane of line 4-4 of FIG. 3.

Referring to FIGS. 2-4, a liquid-to-air heat exchanger is designated in its entirety by the reference number 20. The liquid-to-air heat exchanger 20 includes a liquid inlet 22 entering a liquid passage header 24 that feeds a plurality of liquid passages 26 (FIGS. 3 and 4) extending through the heat exchanger and returning to an outlet header 28 having an outlet 30. An air inlet header 40 directs air through air passages 42 (FIG. 3) extending between and in thermal communication with the liquid passages 26 so that the air is cooled by the cold liquid passing through the liquid passages. An air outlet header 44 directs cooled air exiting the heat exchanger 20 to sites where needed.

As illustrated in FIG. 3, injectors 50 are mounted in the liquid passage header 24 so that when they are activated, they release high pressure liquid toward the liquid passages 26 extending from the header so that the high-pressure liquid enters the liquid passages. Because the liquid from the injectors 50 is at a higher pressure than other liquid in the header 24, it preferentially enters the liquid passages 26. The liquid released from the injectors 50 is also at a higher temperature than the liquid in the header 24 so it warms the interior surface of the passages 26 and melts ice accumulated on corresponding air passages 42 of the heat exchanger 20. As shown in FIGS. 3 and 4, the injectors 50 are connected to a common manifold 52. The injectors 50 are individually controlled by an electronic controller 54 to open and deliver high-pressure liquid from the open injector.

Figure 5:
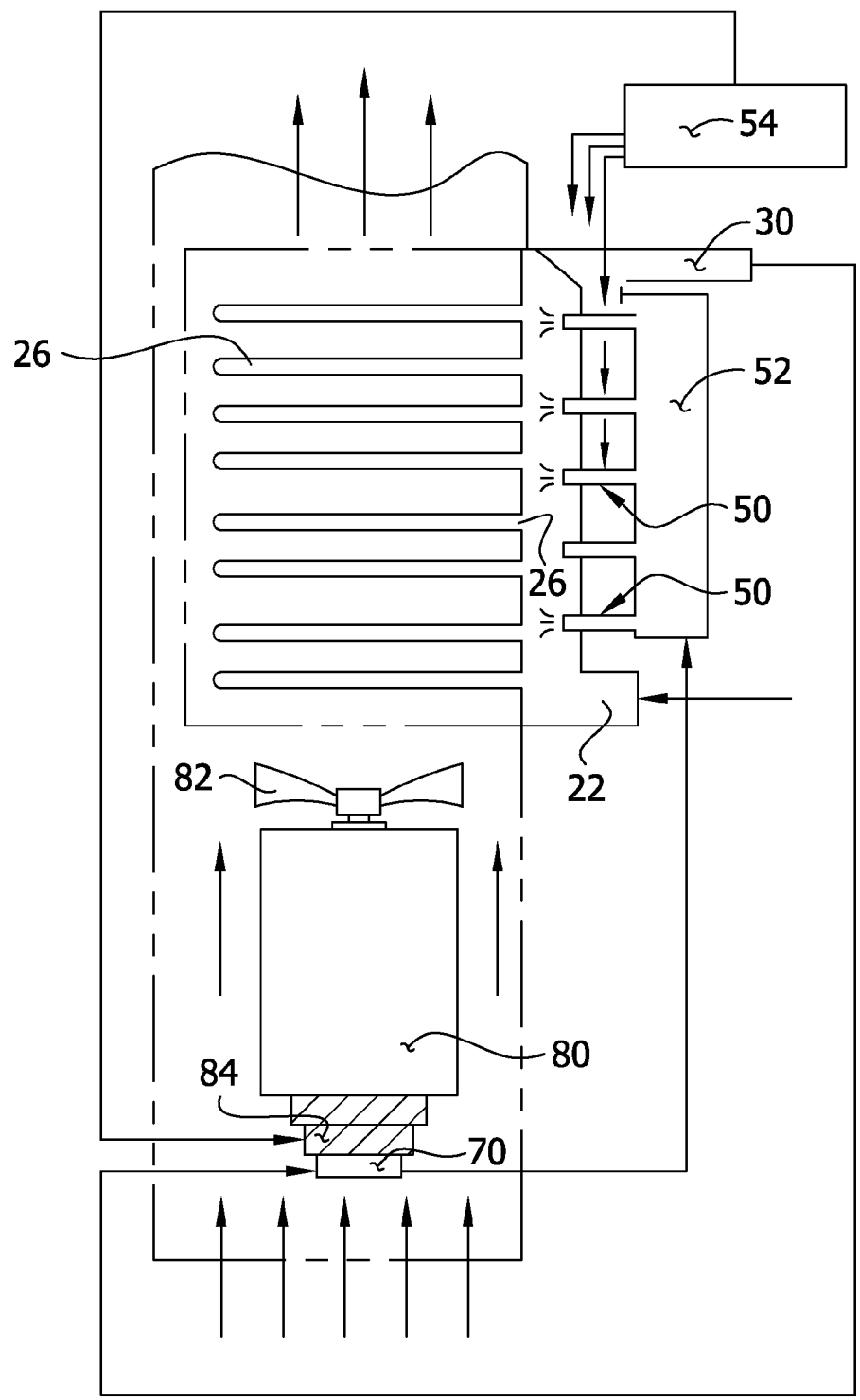
FIG. 5 is a schematic of a heat exchanger having allowing a portion to be defrosted while continuing to cool.

FIG. 5 schematically illustrates a heat exchanger system, generally designated 60. Cold liquid entering the heat exchanger 20 through the inlet 22 picks up heat as it travels through the liquid passages 26, and eventually enters the outlet header 28 at a substantially higher temperature than that at which it entered the heat exchanger. The warmer liquid exiting the heat exchanger 20 through the outlet 30 is re-circulated by a high-pressure pump 70 to the manifold 52 for delivery through the selected injector 50 when opened by the controller 54.

In one embodiment, the high-pressure pump 70 is driven by a motor 80 used to turn a fan 82 for pushing air through the air passages 42 (FIG. 3) of the heat exchanger 20. A clutch 84 is provided between the motor 80 and high pressure pump 70 selectively activating the pump. In one embodiment, the clutch 84 is controlled by the controller 54 so the warmer liquid is only pressurized in the manifold 52 when needed.

The high-pressure pump 70 provides warmer liquid to the manifold 52 supplying the injectors 50. When the controller 54 opens a selected injector 50, warmer liquid is delivered to the liquid header 24 immediately upstream from a preselected section of liquid passages 26. Because the warmer liquid is delivered at a higher pressure than surrounding cold liquid in the inlet header 24, the warmer liquid preferentially enters the liquid passages 26 where it defrosts corresponding air passages 42 in the heat exchanger 20. The controller 54 selectively opens and closes injectors 54 to melt ice accumulated in corresponding sections of the heat exchanger 20 without significantly impacting the overall cooling capacity of the heat exchanger.

As will be appreciated by those skilled in the art, the heat exchanger 20 disclosed above maintains sufficient overall cooling capacity by selectively defrosting sections of the heat exchanger while permitting cooling to continue.

As the design and manufacture of the heat exchanger system 60 are well within the ability of those skilled in the art, they will not be described in detail.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of defrosting a heat exchanger while the heat exchanger continues to cool air passing through the heat exchanger, the heat exchanger including a plurality of liquid passages for carrying cold liquid between an inlet and an outlet, and further including air passages in thermal communication with the liquid passages for cooling air passing through the air passages, the method comprising the steps of:

introducing, using an injector, warmer liquid in liquid phase to a first selected section of the plurality of liquid passages while continuing to provide cold liquid in liquid phase to the liquid passages, the warmer liquid being introduced at a higher pressure than the cold liquid;

maintaining the warmer liquid in liquid phase while passing through the liquid passages;

pushing the air through the air passages using a fan driven by a motor;

re-circulating the warmer liquid from the outlet to the injector using a pump driven by the motor; and selectively activating the pump using a clutch coupled to the motor.

2. The method as set forth in claim 1, further comprising:

introducing warmer liquid to a second selected section of the plurality of heat exchanger liquid passages while continuing to provide cold liquid to the liquid passages of the heat exchanger after introducing warmer liquid to the first selected section of the plurality of heat exchanger liquid passages.

3. The method as set forth in claim 1, further comprising:

sequentially introducing warmer liquid to other selected sections of the plurality of heat exchanger liquid passages while continuing to provide cold liquid to the liquid passages of the heat exchanger after introducing warmer liquid to the first selected section of the plurality of heat exchanger liquid passages.

4. A heat exchanger comprising:

liquid passages extending from a common header connected to a liquid inlet for introducing cold liquid to the header;

air passages extending between and in thermal communication with the liquid passages;

a fan driven by a motor for pushing air through the air passages for cooling the air;

a first injector positioned in the liquid passage header for introducing warmer liquid in liquid phase and at a higher pressure to a section of the liquid passages for defrosting a corresponding section of the air passages, the warmer liquid being maintained in liquid phase while passing through the liquid passages;

a pump driven by the motor and configured to re-circulate the warmer liquid from the outlet to the injector;

a clutch coupled to the motor for selectively activating the pump; and a control for selectively introducing warmer liquid through the first injector to the section of the liquid passages.

5. The heat exchanger as set forth in claim 4, further comprising:

a plurality of injectors including said first injector, each of said plurality of injectors being connected to a common manifold, wherein the control introduces warmer liquid through a selected injector of the plurality of injectors to defrost a corresponding section of the air passages.

6. The heat exchanger as set forth in claim 4, further comprising:

a plurality of injectors including said first injector, each of said plurality of injectors being connected to a common manifold, wherein the control sequentially introduces warmer liquid through a each injector of the plurality of injectors to defrost a corresponding section of the air passages.

7. The heat exchanger as set forth in claim 4, wherein the heat exchanger is positioned inside an aircraft.

8. The heat exchanger as set forth in claim 7, in combination with said aircraft.

9. A heat exchanger system comprising:
a heat exchanger having liquid passages extending between a common header connected to a liquid inlet for introducing cold liquid to the header and a common outlet header connected to a liquid outlet for discharging liquid, and air passages extending between and in thermal communication with the liquid passages;
a fan driven by a motor for pushing air through the air passages for cooling the air;
a manifold in fluid communication with the liquid outlet of the heat exchanger;
a pump driven by the motor and operatively connected between the liquid outlet and the manifold for re-circulating the warmer liquid and pressurizing the warmer liquid in the manifold;
a clutch coupled to the motor for selectively activating the pump;
a first injector positioned in the liquid passage header and connected to the manifold for introducing the warmer liquid to a section of the liquid passages for defrosting a corresponding section of the air passages, the warmer liquid being maintained in liquid phase while passing through the liquid passages; and
a control operatively connected to the first injector for selectively opening the injector to introduce the warmer liquid through the first injector to the section of the liquid passages for defrosting the corresponding section of the air passages.

10. The heat exchanger system as set forth in claim 9, further comprising:
a plurality of injectors including said first injector, each of said plurality of injectors being in fluid communication with the manifold, and the control being operatively connected to each of said plurality of injectors for selectively opening an injector of said plurality of injectors to introduce the warmer liquid through the opened injector to the section of the liquid passages for defrosting the corresponding section of the air passages.

11. The heat exchanger system as set forth in claim 10, wherein the control operates the injectors in sequence to introduce the warmer liquid through each of the plurality of injectors in sequence to defrost a corresponding section of the air passages.

12. The heat exchanger system as set forth in claim 9, wherein the heat exchanger is positioned inside an aircraft.

13. The heat exchanger system as set forth in claim 12, in combination with said aircraft.

\* \* \* \* \*